United States Patent [19]

Ozeki et al.

[11] 3,855,168
[45] Dec. 17, 1974

[54] ADHESIVE COMPOSITION FOR BONDING POLYESTER FIBER TO RUBBER

[75] Inventors: Takao Ozeki; Kazuo Ito, both of Ohtake; Yutaka Maeda, Iwakuni; Takeshi Kudo, Ohtake, all of Japan

[73] Assignee: Mitsubishi Rayon, Ltd., Tokyo, Japan

[22] Filed: Aug. 1, 1972

[21] Appl. No.: 277,127

[30] Foreign Application Priority Data
Aug. 3, 1971   Japan.............................. 46-58510
Aug. 6, 1971   Japan.............................. 46-59470

[52] U.S. Cl.......... 260/29.3, 117/138.8 F, 156/335, 260/53 HA, 260/54, 260/844, 260/845, 260/846, 260/847
[51] Int. Cl.............................................. C08g 51/24
[58] Field of Search...... 260/29.3, 844, 845, 53 HA, 260/54; 156/335; 117/138.8 F

[56] References Cited
UNITED STATES PATENTS

| | | | |
|---|---|---|---|
| 3,538,972 | 11/1970 | Yurcick ............................. | 260/29.3 |
| 3,578,613 | 5/1971 | Tai...................................... | 260/29.3 |
| 3,660,202 | 5/1972 | Edington et al. .................... | 156/335 |
| 3,705,868 | 12/1972 | Honda et al. ....................... | 260/29.3 |

*Primary Examiner*—Lorenzo B. Hayes
*Attorney, Agent, or Firm*—Armstrong, Nikaido & Wegner

[57] ABSTRACT

The bondability of polyester fiber to rubber is markedly improved by incorporating a polynucleus halophenol compound [A] of the general formula,

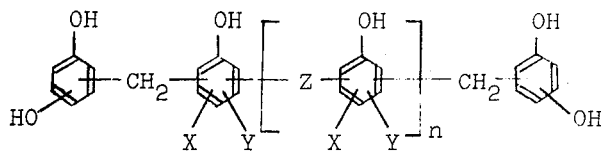

wherein X is chlorine or bromine, Y is chlorine, bromine, hydrogen, hydroxyl or an alkyl or 1 to 4 carbon atoms, Z is —$S_x$— in which x is an integer of 1 to 4; —$S(O)_y$— in which y is 1 or 2; or

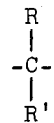

in which R and R' are hydrogen or $C_{1-8}$ alkyl, $C_{6-18}$ aryl, $C_{7-18}$ aralkyl, $C_{1-8}$ haloalkyl or furyl groups, and n is an integer of 1 to 6, into a conventional adhesive composition consisting of a thermosetting resin [B] of resorcinol and formaldehyde and a rubber latex [C], in such a proportion that the solid weight ratio [A]/[B] is 10/1 to 1/10 and the solid weight ratio {[A]+[B]}/[C] is 2/1 to 1/10.

11 Claims, No Drawings

ADHESIVE COMPOSITION FOR BONDING POLYESTER FIBER TO RUBBER

This invention relates to a novel adhesive composition for strongly bonding polyester fiber to rubber.

Because of their excellent physical and chemical characteristics, polyester fiber is useful as a reinforcement for rubber products such as tires, conveyor beltings and the like. However, owing to a low content of functional groups, polyester fiber is difficult to bond to other materials.

As an adhesive for bonding fibrous materials to rubbers, there has heretofore been used generally a mixture (hereinafter referred to as RFL) of resorcinol-formaldehyde resin (hereinafter referred to as RF resin) and rubber latex. To bond fiber to rubber by means of such a RFL adhesive, the fiber is first coated with RFL, then heat-treated, and the thus treated fiber is embedded in an unvulcanized rubber, followed by vulcanization.

As the resin component of RFL, there is generally used an initial condensation product of resorcinol and formaldehyde (referred to hereinafter as RF initial condensate) in the presence of an alkali catalyst. The RFL prepared therefrom exhibits satisfactory effect in bonding fibers such as rayon and nylon to rubber and is widely used in bonding a tire cord to rubber which is one example of uses under the most drastic conditions. Even this RFL, however, is unable to satisfactorily bond polyester fiber to rubber.

Consequently, in order to improve the bonding of polyester fiber to rubber, various adhesives or bonding methods have been proposed; examples thereof include a two-stage bonding method in which the polyester fiber is first treted with a polyepoxide, polyvinyl chloride or polyethylene-imine, and then treated with RFL, and a single-stage bonding method which utilizes an adhesive composition having incorporated thereinto an isocyanate derivative, a resorcinol-triallyl cyanurate-formaldehyde reaction product, the composition mentioned in British Pat. No. 1,140,528, or a novolak type resorcinol-formaldehyde resin.

The one-stage bonding method is desirable in view of both cost and simplicity of treatment. However, in conventional methods, when, for example, an isocyanate derivative is used in the adhesive, there may arise problems of toxicity, instability of the adhesive, and insufficiency in bond during curing at high temperatures, and on the other hand, when a resorcinol-triallyl cyanurate-formaldehyde reaction product, the composition disclosed in British Pat. No. 1,140,528, or a novolak type resorcinol-formaldehyde resin is used, the adhesive composition becomes costly owing to an increased amount of an expensive resin being necessary to incorporate and, in addition, a heat treatment at a very high temperature is required to obtain a high bond strength.

An object of this invention is to eliminate the above-mentioned disadvantages of the conventional techniques and to provide an adhesive composition which is excellent in bonding polyester fiber to rubber.

Other objects and advantages of this invention will become clear from the following description.

The adhesive composition of this invention comprises an aqueous dispersion containing a polynucleus halophenol compound [A] represented by the general formula,

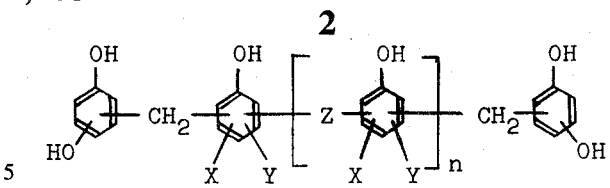

wherein X is chlorine or bromine, Y is chlorine, bromine, hydrogen, hydroxyl, or an alkyl of 1 to 4 carbon atoms, Z is $-S_x-$ in which $x$ is an integer of 1 to 4; $-S(O)_y-$ in which $y$ is 1 or 2, or

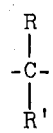

in which R and R', which may be the same or different, are hydrogen or $C_{1-8}$ alkyl, $C_{6-18}$ aryl, $C_{7-18}$ aralkyl, $C_{1-8}$ haloalkyl or furyl groups, and $n$ is an integer of 1 to 6, a thermosetting resin [B] which is obtained by reaction of resorcinol with formaldehyde in a molar ratio within the range of 1/0.7 to 1/3.0 in the presence of an alkali catalyst, and a rubber latex [C] in such a proportion that the solid weight ratio [A]/[B] is 10/1 to 1/10 and the solid weight ratio {[A]+[B]}/[C] is 2/1 to 1/10. The term "halophenol" used herein refers to chlorophenol and bromophenol.

The adhesive composition of this invention exhibits a strong adhesion as a result of incorporation of a relatively small amount of a polynucleus halophenol compound [A] represented by the aforementioned general formula. When the component [A] is incorporated in nearly the same amount as that of the adhesive component used in the conventional single-stage bonding method, it is possible to obtain a strong adhesion under milder heat-treatment conditions than in the conventional method. Moreover, a bonded laminate made of polyester fiber and rubber by use of the adhesive composition of this invention is excellent particularly in retaining the bond strength at a temperature as high as 120° to 140°C.

Although a definite reason has not been confirmed, it can be considered that the above-mentioned excellent adhesion presumably bears on easy sorption and penetration of the component [A] into the polyester fiber when the polyester resin is heat-treated after its immersion in the adhesive composition, because the solubility parameter of the component [A] incorporated into the adhesive composition is nearer to that of the polyester than that of the conventional adhesive resin component is, and on at least two halogenated phenols being adjacent to each other in the molecular skeleton of the component [A], whereby the halogen atoms increase the interaction effect between the component [A] and the aromatic nuclei of the polyester based on polar bond.

Moreover, it is possible for the component [A] to cause a dehydration-condensation with the thermosetting resorcinol-formaldehyde resin [B], due to the hydroxybenzene group bonded at the end of the molecule at the time of heat-treatment and crosslink the resin to reinforce the adhesive film. It is also possible that a hydrogen bond is formed between the component [A] and a vinylpyridine latex preferably used as the rubber latex.

The adhesive composition of this invention contains in combination the component [A] as a penetrating component into polyester, the component [B] as a reinforcement for the adhesive coating, and the component [C] having an affinity for the rubber. Thus, by taking into account the idea of specialization, the adhesive composition of this invention has succeeded in securing an extremely high adhesion which has never been achieved in the case where a mixture of a thermosetting resorcinol-formaldehyde resin and a rubber latex or a mixture of the component [A] and a rubber latex or a mixture thereof with formaldehyde is used as an adhesive.

The polynucleus halophenol compound [A], which is the first component of the adhesive composition of this invention, may be prepared in high yields by, for example, the following reaction scheme:

idation with potassium chromate, potassium permanganate, hydrogen peroxide or the like under suitable conditions into another halogenated phenol polynucleus product containing

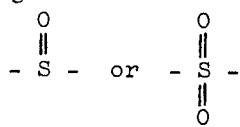

for Z, which can also be prepared by reacting the halogenated phenol with thionyl chloride or sulfuryl chloride at a low temperature. In the case where Z is

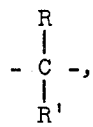

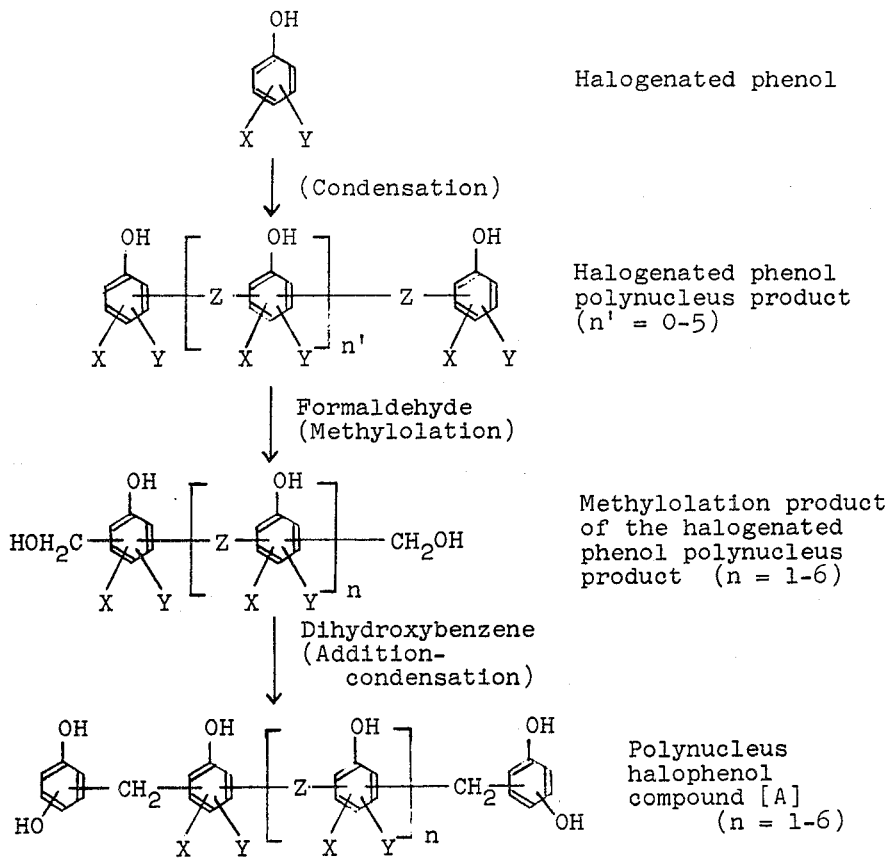

In the above formulas, X, Y and Z have the same meanings as defined above.

In the above reaction steps, the condensation reaction of halogenated phenols (this term means herein chlorinated phenols and brominated phenols) can be carried out in a known manner which is most suitable for each kind of the linking group Z. For example, when Z is —$S_x$—, the desired product can be prepared by reacting a halogenated phenol with elementary sulfur or a sulfur compound such as sulfur monochloride, sulfur dichloride, or the like. The reaction with elementary sulfur is, for example, effected with an alkali catalyst at 130°–200°C (see Kunststoff Rundschau, 13, 235 & 291 (1966)), and the reaction with sulfur mono- or di-chloride is, for example, effected at a low temperature in a non-aqueous, inert solvent (see J. Am. Chem. Soc., 53, 3466 (1931), J. Chem. Soc., 62, 3876 (1962)). The reaction product can be converted by oxthe desired halogenated phenol polynucleus product can be prepared by reacting a halogenated phenol with an aldehyde such as formaldehyde, acetaldehyde, propionaldehyde, heptyl aldehyde, benzaldehyde, phenyl acetaldehyde, crotonaldehyde, cinnamaldehyde, furfural, chloral, or the like, or with a ketone such as acetone, methyl ethyl ketone, cyclohexanone, dibenzyl ketone, or the like. This reaction is effected with an acid catalyst, such as sulfuric, hydrochloric or acetic acid with or without using a solvent, e.g., water, dioxane, etc. Besides the above methods, the halogenated phenol polynucleus product can also be obtained by first subjecting a phenol containing no halogen substituent to condensation reaction to form a polynucleus product, and then halogenating the resulting product to yield the desired product. This method is particularly useful in the case where the condensation of a halogenated phenol is difficult to effect.

The methylolation reaction of the halogenated phenol polynucleus product prepared by the above-mentioned methods is carried out by dissolving said product in a suitable solvent such as water, dioxane or the like, in order to ensure uniform reaction, and reacting the solution with a formaldehyde-liberating substance such as formalin, trioxane, paraformaldehyde or the like under alkaline conditions.

The addition-condensation reaction of the methylolated halogenated phenol polynucleus product with dihydroxybenzene is carried out in the presence or absence of a catalyst at 20° to 200°C under such conditions that the dihydroxybenzene is present in excess of the methylol groups.

In this invention, a polynucleus halophenol [A] obtained by a method other than those mentioned above can, of course, be used.

Examples of the halogenated phenols for use in the above-mentioned reaction include o-chlorophenol, p-chlorophenol, o-bromophenol, p-bromophenol, 3,4-dichloro phenol, 3,4-dibromophenol, 3-chloro-4-bromophenol, 3-methyl-4-chlorophenol, 3-tert-butyl-6-bromophenol, 4-chloro-resorcinol, 4-bromoresorcinol, 3-methyl-4-bromophenol, 3-ethyl-4-chlorophenol, 3-ethyl-4-bromophenol, 3-isopropyl-6-chlorophenol, 3-isopropyl-6-bromophenol, 3-tert-butyl-6-chlorophenol, 2-ethyl-5-chlorophenol, and 2-ethyl-5-bromophenol- Further, in carrying out the condensation reaction, the above-mentioned halogenated phenols can be co-condensed with up to an equivalent amount of a bifunctional phenol such as, for example, o-cresol, p-cresol, o-ethylphenol, p-ethylphenol, o-tert-butylphenol, p-tert-butylphenol, o-benzylphenol, p-benzylphenol, α-resorcylic acid, β-resorcylic acid, 4-hexylresorcinol, methyl p-hydroxybenzoate or the like. The co-condensation with such a bifunctional phenol results in a resin having moderately controlled melting point and dispersibility in water without reduction in the adhesive characteristics, thereby facilitating the production of resins.

Examples of dihydroxybenzenes to be used in forming the terminal groups are resorcinol, catechol and hydroquinone. The terminal groups at both ends of a molecule may be the same or different.

The polynucleus halophenol compound [A] thus obtained ordinarily melts by heating at a temperature of at least 200° to 260°C for a short time and is satisfactorily soluble or dispersible in water or an aqueous alkaline solution.

Examples of polynucleus halophenol compounds [A] for use in this invention are as follows:

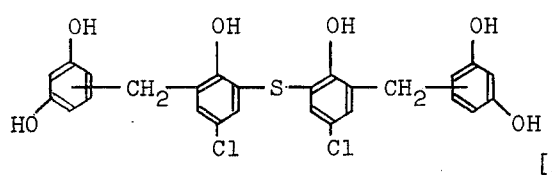

[A$_2$]

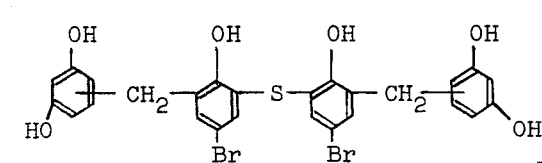

[A$_{13}$]

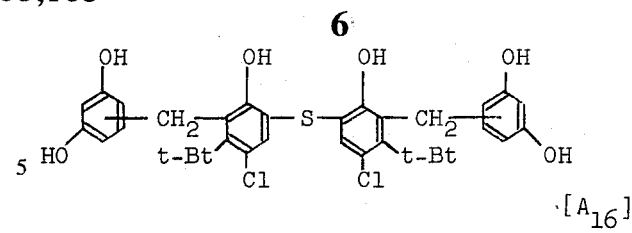

[A$_{16}$]

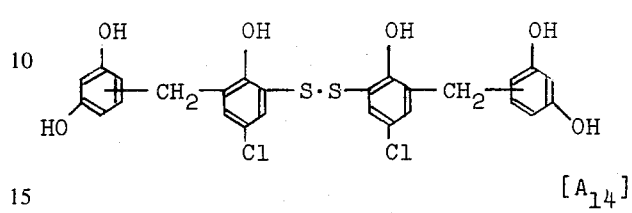

[A$_{14}$]

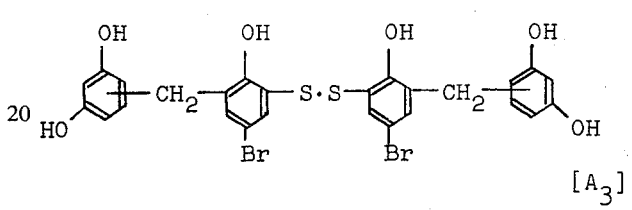

[A$_3$]

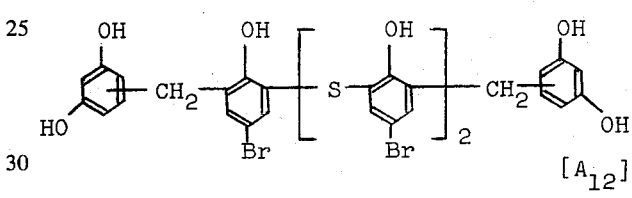

[A$_{12}$]

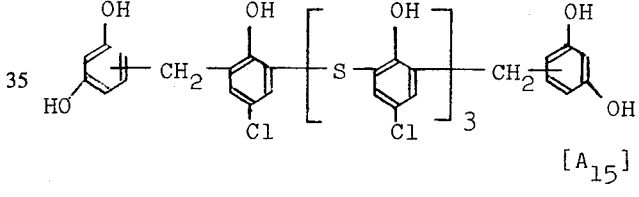

[A$_{15}$]

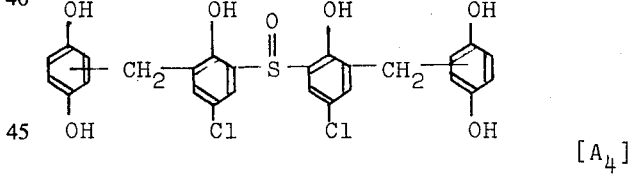

[A$_4$]

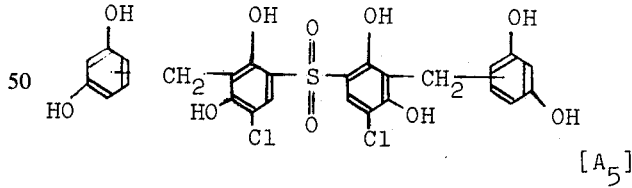

[A$_5$]

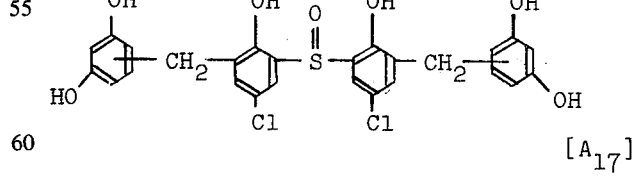

[A$_{17}$]

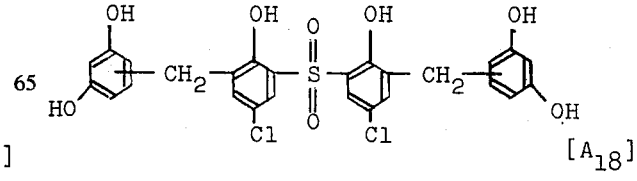

[A$_{18}$]

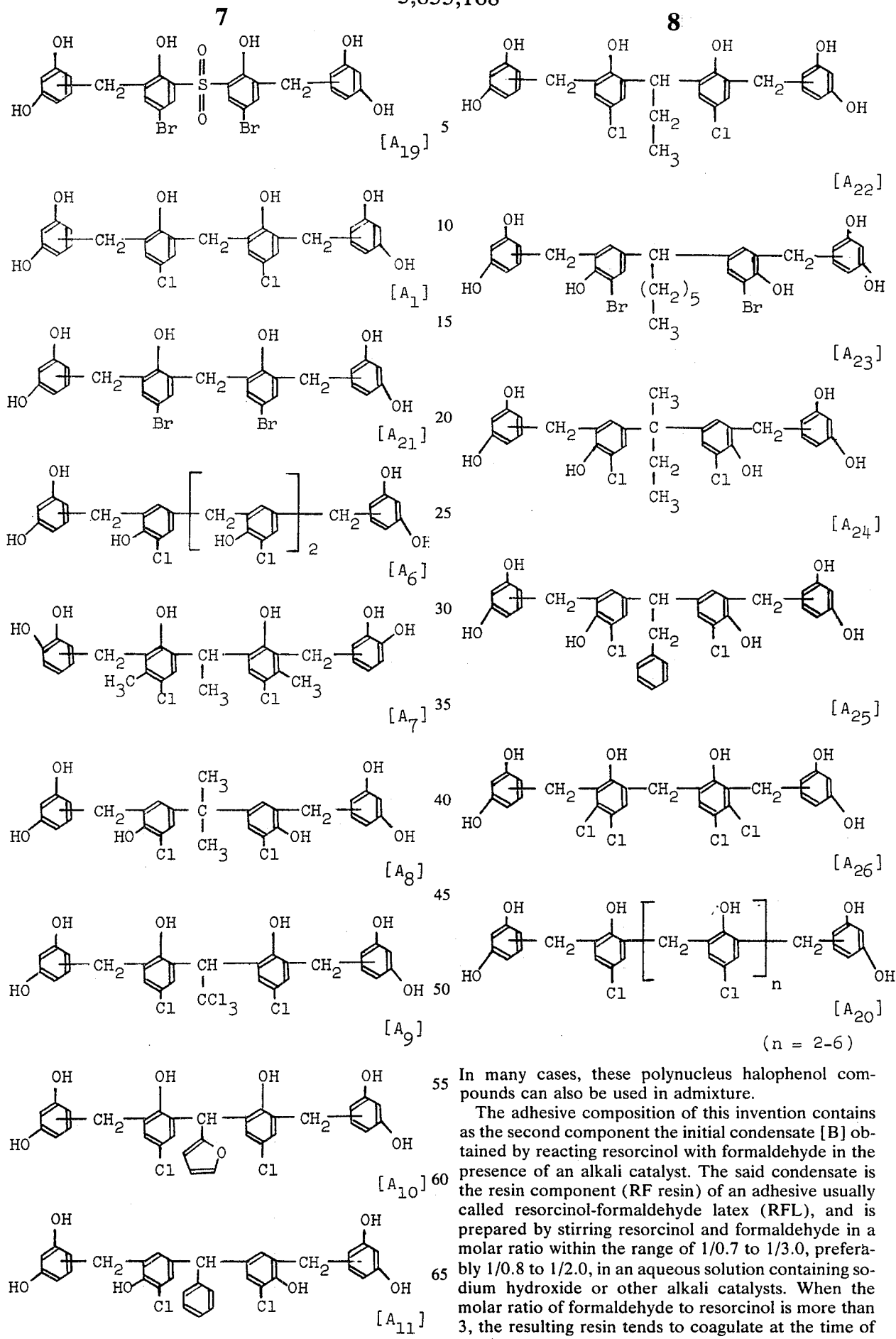

In many cases, these polynucleus halophenol compounds can also be used in admixture.

The adhesive composition of this invention contains as the second component the initial condensate [B] obtained by reacting resorcinol with formaldehyde in the presence of an alkali catalyst. The said condensate is the resin component (RF resin) of an adhesive usually called resorcinol-formaldehyde latex (RFL), and is prepared by stirring resorcinol and formaldehyde in a molar ratio within the range of 1/0.7 to 1/3.0, preferably 1/0.8 to 1/2.0, in an aqueous solution containing sodium hydroxide or other alkali catalysts. When the molar ratio of formaldehyde to resorcinol is more than 3, the resulting resin tends to coagulate at the time of use and a sufficiently high adhesion is difficult to obtain, and when said ratio is less than 0.7, the reinforcing effect on the adhesive film becomes insufficient. For the above-mentioned resin component, there may be used other various modified thermosetting resorcinol-formaldehyde resins such as a thermosetting resin obtained by preliminarily condensing resorcinol with formaldehyde under acidic conditions and then further reacting the resulting condensate with formaldehyde under alkaline conditions of a pH of 7 or higher. There may also be used a condensate obtained by adding resorcinol and formaldehyde directly to a rubber latex as mentioned hereinafter to dissolve the former in the latter and then subjecting the resulting solution to reaction and aging.

In the adhesive composition of this invention, there is used, as the third component, a rubber latex [C] having an affinity for rubber, which is selected from rubber latices such as natural rubber latex, styrene-butadiene copolymer rubber latex, vinylpyridine-styrene-butadiene copolymer rubber latex, polybutadiene rubber latex, polychloroprene rubber latex, isoprene-isobutylene copolymer rubber latex, butadiene-acrylonitrile copolymer rubber latex, butadiene-methacrylic acid copolymer rubber latex, butadiene-acrylonitrile-methacrylic acid copolymer rubber latex, butadiene-styrene-acrylonitrile copolymer rubber latex, emulsion of a copolymer derived from ethylene and propylene as the base materials, emulsion of polyepichlorohydrin rubber, etc. These rubber latices can be used each alone or in admixture of two or more. Further, they can also be used jointly with halogen-containing polymer latices such as polyvinyl chloride latex, polyvinylidene chloride latex, and the like.

The rubber latices particularly recommendable for use in this invention include vinylpyridine-styrene-butadiene copolymer rubber latex, styrene-butadiene copolymer rubber latex, chloroprene rubber latex, butadiene-acrylonitrile copolymer rubber latex, and natural rubber latex.

The adhesive composition of this invention is prepared by dissolving or dispersing the polynucleus halophenol compound [A] in water or an aqueous alkaline solution such as water containing ammonia or sodium hydroxide and mixing the resulting solution or dispersion with a liquid mixture (RFL) containing the thermosetting resorcinol-formaldehyde resin [B] and the rubber latex [C]; alternatively, by first mixing the component [A] and the component [B], and then gradually adding the component [C] into the resulting mixture. The mixture obtained by mixing the components [B] and [C] and then allowing them to age in RFL which has been conventionally in use, and a method of mixing the RFL with the component [A] is preferable to improve the adhesion of the product.

It is desirable for the adhesive composition of this invention to have a pH of 8 to 10 in view of both the stability of dispersion and the adhesion. Accordingly, the pH of the composition is suitably controlled so as to be kept at a value within said range.

The compounding ratio of each component of the present adhesive composition should be suitably varied depending upon the preparation conditions of each component and the kind of substrate; however in view of the despersion stability of the liquid, adhesion, and the cost of the adhesive, the component [A] and the component [B] are blended in a solid weight ratio of 10/1 to 1/10, preferably 7/1 to 1/2, and the suitable weight ratio of the total resin amount to the rubber latex solid is 2/1 to 1/10 preferably 1/1 to 1/5.

In preparing the adhesive composition of this invention, addition of a modifying agent will cause no trouble. Thus, it is possible to add a novolak-type heat-fusible resin [D], which has been obtained by reacting resorcinol with formaldehyde in a molar ratio of 1/0.3 to 1/0.8, to the components [A], [B] and [C] in a ratio of [D]/[A] of up to 10/1, preferably 8/1 to 1/10. By the addition of the component [D], both of the dispersibility of the resin [A] in water and the stability of the adhesive composition are improved and a strong adhesion can be attained with a relatively small amount of the component [A]. Further, there will arise no problem by adding, as a modifier, a smaller amount of reactive adhesives such as blocked isocyanate, ethylene urea, epoxy compound, and the like, or by addition of a thickening agent and a wetting agent, to improve or control the adhesion. A polynucleus halophenol compound containing a heat-fusible dihydroxy-benzene-formaldehyde resin that is formed as a by-product in the course of preparation of the former can also be used.

The present adhesive composition exhibits an extremely strong adhesion not only in bonding polyester fiber to rubber, but also in bonding organic and inorganic fibrous materials such as rayon, nylon, glassfiber, and the like, to rubber.

An explanation will be given below concerning the procedure for bonding a polyester fiber to rubber by use of the present adhesive composition.

A fibrous material of polyester is dipped into an adhesive composition comprising the above-mentioned polynucleus halophenol [A], resorcinol-formaldehyde resin [B] and rubber latex [C], dried, heat-treated at a temperature of 200° to 260°C, bonded to rubber by heat-pressing and then vulcanized. A more desirable adhesive effect will be obtained at a heat-treatment temperature of 220° to 250°C in a heat-treatment period of 0.5 to 3 minutes. It is desirable from the viewpoint of both operation and adhesion to attach the solid to the fibrous material in a proportion of 1 to 20%, preferably 3 to 10%, by weight. Vulcanization of rubber is preferably carried out at a temperature of 100° to 200°C under a pressure of 1 to 100 kg/cm$^2$. The bonded product of polyester fiber to rubber thus obtained has so high a bond strength that failure is caused in the rubber portion in most cases.

The polyester fiber to be dealt with in this invention is a fiber made of any high-molecular weight polyester obtained from polymethylene glycol and a dicarboxylic acid or its derivative, particularly a fiber made of polyethylene terephthalate obtained from ethylene glycol and terephthalic acid or its derivative, or a fiber made of polyethylene terephthalate which has been modified with a copolymerizable or compatible component. Such a polyester fiber can also be used in admixture with other fibers.

Impregnation of the polyester fiber with the present adhesive composition can be carried out at any stage, such as after spinning of the polyester fiber but in the unstretched state, after stretching of the fiber, or after fabrication into a cord. From the operational viewpoint, however, it is preferable that the impregnation is applied to the cord.

Rubbers as a substrate to which polyester fiber are bonded include natural rubber, polybutadiene rubber, polychloroprene rubber, polyisoprene rubber, butyl rubber, copolymer rubbers such as acrylonitrile-butadiene copolymer rubber, styrene-butadiene copolymer rubber, ethylene propylene-butadiene copolymer rubber, and the like, and rubber compounds obtained by incorporating into these rubbers a vulcanizing agent, vulcanization accelerator, antioxidant, etc.

The press-bonding with vulcanization of rubber to polyester fiber is generally effected under a pressure of one to several hundred kilograms per square centimeter, at a temperature of 100° to 200°C, for a period of 5 to 120 minutes.

The present adhesive composition has a very excellent effect as an adhesive for firmly bonding rubber to polyester fiber in the fields where the best use of the characteristic properties of polyester fiber is made, such as tires and conveyor beltings.

The invention is further explained below in detail with reference to Examples. The bond strength was measured at a pulling speed of 500 mm/min. according to the cord pull-out test (H-test) described in India Rubber World, 114, 213–217 (1946) and expressed in terms of kg/9mm. In the Examples, all parts are by weight.

EXAMPLE 1

A. Preparation of Aqueous Solution of a Polynucleus Halophenol Compound

Five moles of formaldehyde was added to 1 mole of bis(5-chloro-2-hydroxyphenyl)methane and subjected to condensation in an aqueous alkaline solution. Subsequently, the reaction system was neutralized with acetic acid. The reaction product which was separated was recrystallized from aqueous methanol to obtain pure bis(5-chloro-2-hydroxy-3-hydroxymethylphenyl)methane. In 500 g of dioxane was dissolved 0.5 mole of the thus obtained compound, mixed with a solution of 2.5 moles of resorcinol in 500 g of water and allowed to react with heating under reflux for 4 hours. Then, the reaction mixture was added dropwise under stirring into a large excess of water to precipitate a yellowish brown solid, the chief constituent of which was found on elementary analysis to be a polynucleus halophenol compound (compound [$A_1$]) represented by the above-given formula [$A_1$]. 60 Parts of the compound [$A_1$], 30 parts of 28%-ammonia and 210 parts of water were mixed to obtain a solution (solution [$A_1$]).

B. Preparation of Resorcinol-Formalin-Rubber Latex 11.0 Parts of resorcinol, 9.7 parts of 37%-formalin, 3.0 parts of a 10%-aqueous solution of sodium hydroxide and 116.3 parts of water (140.0 parts in total) were allowed to react with stirring at 25°C for about 6 hours to obtain an aqueous solution of thermosetting resorcinol-formaldehyde resin [$B_1$]. 140 Parts of the aqueous solution [$B_1$] was added to 280 parts of a vinyl-pyridine-styrene-butadiene copolymer rubber latex [$C_1$] (Hycar 2518 FS, a product of Nippon Geon) of 40% solid content and left standing for 24 hours at 25°C to obtain a liquid mixture, [$B_1$] + [$C_1$] (hereinafter referred to as RFL-1).

1. Preparation of an adhesive composition.

300 Parts of the solution [$A_1$] and 200 parts of water were added to 420 parts of RFL-1 to obtain an adhesive composition, [$A_1$] + [$B_1$] + [$C_1$], about 20% in solid content.

2. The bonding of the polyester fiber to rubber.

Two 1000-denier 192-filament yarns of polyethylene terephthalate were twisted at 500 turns/m of the primary twist and at 500 turns/m of the final twist to obtain a cord. The cord was dipped into the above-obtained adhesive composition, then dried at 130°C for 1 minute, and heat-treated at 240°C for 1 minute. The amount of the adhesive applied was about 6.5%. The treated cord was embedded in an unvulanized rubber compound mentioned later, and bonding was effected by vulcanizing at 140°C under a pressure of 20 kg/cm$^2$ for 40 minutes.

The adhesion of the polyester fiber to rubber in the above laminate was evaluated by means of the H-test. The mean pull-out force was found to be 13.6 kg/9 mm at room temperature. Observation of the fracture in test specimen revealed that the rupture took place not in the bond layer but, in most of the cases, in the rubber. On the other hand, the above laminate was maintained at a temperature of 120°C for 10 minutes and the H-test was carried out under these conditions to obtain a mean pullout force of 10.8 kg/9 mm, showing a favorable adherence retention at high temperatures.

In order to examine stability of the adhesive composition of this invention, the above adhesive composition was kept at room temperature for 1 month and then applied on a cord in a manner similar to that mentioned above. On evaluating the adherence by the H-test, it was found that the pull-out force was 13.2 kg/9 mm, showing an excellent stock stability.

The breaking strength of the polyester cord used in the present Example was 14.5 kg.

Composition of the unvulcanized rubber compound:

| Parts | |
|---|---|
| 100 | Natural rubber RSS No. 3 |
| 5.0 | Zinc oxide |
| 2.0 | Stearic acid |
| 30.0 | Carbon black, GPF |
| 1.0 | Antioxidant D (phenyl-$\beta$-naphthylamine) |
| 7.0 | Aromatic oil |
| 2.25 | Sulfur |
| 1.0 | Accelerator DM (dibenzothiazole disulfide) |

Comparative Example 1

For comparison, a cord was treated in a manner similar to that in Example 1 with RFL-1 which was composed of [$B_1$] and [$C_1$], that is the composition obtainable by eliminating the component [$A_1$] from the adhesive composition, [$A_1$] + [$B_1$] + [$C_1$] in Example 1. It was found that the mean pull-out force by the H-test was 5.5 kg/9 mm at room temperature and 3.8 kg/9 mm at 120°C, and rupture took place, in most of the cases, at the interface of polyester and the adhesive layer. On the other hand, a cord was treated in a manner similar to that in Example 1 with an adhesive composition, [$A_1$] + [$B_1$] + [$C_1$], in Example 1, in which [$B_1$] had been replaced by an aqueous sodium hydroxide solution containing formaldehyde, that is the component [$B_1$] without containing resorcinol. The mean pull-out force by the H-test was 5.7 kg/9 mm at room temperature, and that rupture took place in the adhesive layer.

Comparative Example 2

For comparison, an adhesive composition was prepared by using a compound of the formula,

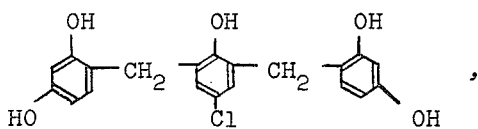

described in British Pat. No. 1,140,528 in place of the component [$A_1$] in the adhesive composition, [$A_1$] + [$B_1$] + [$C_1$], in Example 1. A cord was treated in a manner similar to that in Example 1 with the above composition. The mean pull-out force by the H-test was 13.5 kg/9 mm at room temperature and 9.8 kg/9 mm at 120°C, showing a decreased adherence retention at high temperatures.

Comparative Example 3

For comparison, an adhesive having a composition as given below, which had been proposed as a one-stage treating agent in U.S. Pat. No. 3,547,729, was used. The heat treatment and preparation of bond were carried out according to the procedure given in Example 3(a) in said patent specification. On evaluating the adherence by the H-test, it was found that the mean pull-out force was 11.4 kg/9 mm at room temperature and 7.5 kg/9 mm at 120°C.

The adhesive composition used was composed of (as solids):
a. 22 parts of novolak-type resin, resorcinol/formaldehyde = 1/0.68 (by mole);
b. 10 parts of resol-type resin, resorcinol/formaldehyde = 1/1.19 (by mole);
c. 22 parts of vinylpyridine-styrene-butadiene copolymer latex (41%).

EXAMPLE 2

0.5 Mole of bis(5-chloro-2-hydroxyphenyl) sulfide, 4 moles of formaldehyde (162 g of 37%-formalin) and 1 mole of sodium hydroxide were dissolved in about 1 liter of dioxane, and allowed to react with stirring at 40°C for 48 hours. After completion of the reaction, the reaction mixture was neutralized with acetic acid to pH 6, freed from the excess formaldehyde and dioxane by distillation, and washed with water to obtain dimethylol derivative of bis(5-chloro-2-hydroxyphenyl) sulfide.

0.5 Mole of the above dimethylol derivative was mixed with 2 moles of resorcinol and allowed to react under a nitrogen atmosphere while heating up to 150° to 170°C and removing the liberated water by distillation. The reaction mixture was freed from the excess resorcinol by extraction with warm wter and the residue was dried to obtain a resinous matter melting at 150° to 170°C. On elementary analysis, the main constituent was found to be a polynucleus halophenol compound (compound [$A_2$]) represented by the above-given formula [$A_2$].

The above compound [$A_2$] was treated in a manner similar to that in Example 1 to obtain 300 parts of a 20%-aqueous ammonia solution (solution [$A_2$]).

300 Parts of the solution [$A_2$] and 200 parts of water were added to 420 parts of RFL-1 to obtain an adhesive composition, [$A_2$] + [$B_1$] + [$C_1$], 20% in solid content. The adhesive composition was violet black in color and showed no gel formation on long storage.

In a manner similar to that in Example 1, a polyester cord was dipped into the above adhesive composition, dried and heat-treated. The treated cord was embedded in natural rubber compound similar to that in Example 1 and vulcanization-bonded. The mean pull-out force by H-test was 13.4 kg/9 mm at room temperature and rupture took place in rubber. Further, the H-test was carried out at a high temperature of 120°C; the mean pull-out force was 11.2 kg/9 mm and rupture took place, in most of the cases, in rubber.

In a manner similar to that mentioned above, a cord was treated with the above adhesive composition which had been stored for five days, and then vulcanized. The H-test at room temperature gave a mean pull-out force of 13.2 kg/9 mm.

EXAMPLES 3 TO 25

By following the same procedure as mentioned in Example 1 or 2, the following polynucleus halophenol compounds were obtained:

Bis(5-bromo-2-hydroxyphenyl) disulfide-resorcinol-based resin (aforesaid formula [$A_3$])

Bis(5-chloro-2-hydroxyphenyl) sulfoxide-hydroquinone-based resin (aforesaid formula [$A_4$])

Bis(5-chloro-2,4-dioxyphenyl) sulfone-resorcinol-based resin (aforesaid formula [$A_5$])

Trimeric o-chlorophenol-formaldehyde resin-resorcinol-based resin (aforesaid formula [$A_6$])

1,1-Bis(5-chloro-4-methyl-2-hydroxyphenyl) ethane-catechol-based resin (aforesaid formula [$A_7$])

2,2-Bis(5-chloro-4-hydroxyphenyl) propane-resorcinol-based resin (aforesaid formula [$A_8$])

1,1-Bis(5-chloro-2-hydroxyphenyl)-2,2,2-trichloroethane-resorcinol-based resin (aforesaid formula [$A_9$]).

Bis(5-chloro-2-hydroxyphenyl) furanylmethane-resorcinol-based resin (aforesaid formula [$A_{10}$])

Bis(5-chloro-4-hydroxyphenyl) phenylmethane-resorcinol-based resin (aforesaid formula [$A_{11}$])

p-Bromophenol-sulfur resin trimer-resorcinol-based resin (aforesaid formula [$A_{12}$])

Bis(5-bromo-2-hydroxyphenyl) sulfide-resorcinol-based resin (aforesaid formula [$A_{13}$])

Bis(5-chloro-2-hydroxyphenyl) disulfide-resorcinol-based resin (aforesaid formula [$A_{14}$])

A resin based on a dimethylol derivative of a polynucleus halophenol compound, which was prepared by heating and reacting 1 mole of p-chlorophenol with 0.15 mole of sulfur using a small amount of sodium hydroxide as catalyst, and resorcinol [aforesaid formula [$A_{15}$])

Bis(5-chloro-3-tert-butyl-2-hydroxyphenyl) sulfide-resorcinol-based resin (aforesaid formula [$A_{16}$])

Bis(5-chloro-2-hydroxyphenyl) sulfoxide-resorcinol-based resin (aforesaid formula [$A_{17}$])

Bis(5-chloro-2-hydroxyphenyl) sulfone-resorcinol-based resin (aforesaid formula [$A_{18}$])

Bis(5-bromo-2-hydroxyphenyl) sulfone-resorcinol-based resin (aforesaid formula [$A_{19}$])

Bis(5-bromo-2-hydroxyphenyl) methane-resorcinol-based resin (aforesaid formula [$A_{21}$])

1,1-Bis(5-chloro-2-hydroxyphenyl) propane-resorcinol-based resin (aforesaid formula [$A_{22}$])

1,1-Bis(5-bromo-4-hydroxyphenyl) heptane-resorcinol-based resin (aforesaid formula [$A_{23}$])

2,2-Bis(5-chloro-4-hydroxyphenyl) butaneresorcinol-based resin (aforesaid formula [$A_{24}$])
1,1-Bis(5-chloro-4-hydroxyphenyl)-2-phenylethane-resorcinol-based resin (aforesaid formula [$A_{25}$])
Bis(4,5-dichloro-4-hydroxyphenyl) methane-resorcinol-based resin (aforesaid formula [$A_{26}$])

Adhesive compositions, [$A_3$] − [$A_{26}$] + [$B_1$] + [$C_1$], were obtained in the same manner as in Example 1, except that the abovesaid [$A_3$] to [$A_{26}$] were used in place of [$A_1$]. In the same manner as in Example 1, polyester cords were dipped into these compositions and dried to form laminates, on which the adhesion was measured at room temperature and at 120°C. The results obtained were as shown in Table 1.

pound (compound [$A_{27}$]).

On the other hand, 11.0 parts of resorcinol, 16.2 parts of 37%-formalin, 3.0 parts of a 10%-aqueous solution of sodium hydroxide, and 235.8 parts of water (266 parts in total) were allowed to react with stirring at 25°C for 6 hours to obtain an aqueous solution of a thermosetting resorcinol-formaldehyde resin [$B_2$]. The aqueous solution [$B_2$] was added dropwise to a mixture of 200 parts of a vinylpyridine-styrene-butadiene copolymer rubber latex (Hycar 2518 FS, a product of Nippon Geon, 40% in solid content), 50 parts of a styrene-butadiene copolymer rubber latex (Nipol LX-110, a product of Nippon Geon, 40% in solid content), Table 1

| Example No. | Adhesive composition Component [A] | [A]/[$B_1$]/[$C_1$], weight ratio | Heat treatment °C × minute | Adhesion by H-test kg/9 mm Room temp. | 120°C |
|---|---|---|---|---|---|
| 3 | [$A_3$] | 4/1/8 | 245 × 1 | 12.4 | 10.8 |
| 4 | [$A_4$] | do. | do. | 12.3 | 9.9 |
| 5 | [$A_5$] | do. | 220 × 1 | 12.8 | 10.8 |
| 6 | [$A_6$] | do. | 245 × 1 | 13.4 | 11.0 |
| 7 | [$A_7$] | do. | do. | 11.8 | 9.7 |
| 8 | [$A_8$] | do. | 250 × 1 | 13.5 | 11.2 |
| 9 | [$A_9$] | do. | 245 × 1 | 11.4 | 10.2 |
| 10 | [$A_{10}$] | do. | do. | 10.5 | 9.3 |
| 11 | [$A_{11}$] | do. | do. | 11.7 | 9.5 |
| 12 | [$A_{12}$] | do. | do. | 13.2 | 11.1 |
| 13 | [$A_{13}$] | do. | 230 × 1 | 13.3 | 11.0 |
| 14 | [$A_{14}$] | do. | 230 × 1.5 | 12.8 | 10.9 |
| 15 | [$A_{15}$] | do. | 220 × 2 | 12.5 | 10.5 |
| 16 | [$A_{16}$] | do. | 245 × 1 | 12.0 | 10.3 |
| 17 | [$A_{17}$] | do. | do. | 12.7 | 10.1 |
| 18 | [$A_{18}$] | do. | do. | 13.1 | 10.7 |
| 19 | [$A_{19}$] | do. | do. | 12.4 | 10.5 |
| 20 | [$A_{20}$] | do. | 240 × 1.5 | 13.5 | 11.2 |
| 21 | [$A_{22}$] | do. | do. | 12.2 | 10.3 |
| 22 | [$A_{23}$] | do. | do. | 10.7 | 9.8 |
| 23 | [$A_{24}$] | do. | do. | 10.9 | 10.0 |
| 24 | [$A_{25}$] | do. | do. | 11.2 | 10.2 |
| 25 | [$A_{26}$] | do. | do. | 13.2 | 10.8 |
| Comparative Example | — | 0/1/8 | 245 × 1 | 5.7 | 3.8 |

EXAMPLE 26

One mole of p-chlorophenol and 0.5 mole of formaldehyde (40.5 g of 37%-formalin) were dissolved in a mixed solution (1:1) of dioxane and water, admixed with 1 g of concentrated hydrochloric acid and 1 g of oxalic acid, and heated. After having been stirred under a nitrogen atmosphere at 100°C for 4 hours, the reaction mixture was freed from the solvent by distillation to obtain a p-chlorophenol-formaldehyde resin of the novolak type. The compound consisted of a mixture of p-chlorophenol polynucleus product, the main component being a bi-nucleus product. The compound was dissolved in an aqueous solution containing 1.5 moles of formaldehyde (122 g of 37%-formalin) and 1 mole of sodium hydroxide and allowed to react with stirring at 40°C for 48 hours. After completion of the reaction, the reaction mixture was neutralized with acetic acid to precipitate dimethylol derivative of a p-chlorophenol-formaldehyde resin. The dimethylol derivative was washed with water, admixed with 1 mole of resorcinol and water, and heated at 100°C to form a solution. The reaction was continued for about 4 hours and then the reaction mixture was cooled. The precipitated product was collected by filtration and dried to obtain a mixed polynucleus halophenol comand 60 parts of water. The mixture was aged for 24 hours while being stirred to obtain a liquid mixture, [$B_2$] + [$C_2$] (hereinafter referred to as RFL-2). The above compound [$A_{27}$] was dissolved in ammonia to form an aqueous ammonia solution of 20% solid content. 100 Parts of this aqueous solution was mixed with 54.5 parts of RFL-2 to obtain an adhesive composition, [$A_{27}$] + [$B_2$] + [$C_2$], which showed no gel-formation on long storage.

A polyester tire cord, which is the same as used in Example 1, a nylon tire cord and a rayon tire cord, which are mentioned below, were dipped into the above adhesive composition which had been aged for 3 days, then dried at 130°C for 1 minute, and heat-treated. The treated tire cords were vulcanization-bonded in the same way as in Example 1 and the adhesion was evaluated at room temperature to obtain the results as shown in Table 2. The nylon cord was made of 840 D/2 nylon 66 fibers and the rayon cord was made of 1650 D/2 high-tenacity rayon fibers. In Table 2 are also shown the results obtained in comparative examples where conventional adhesive compositions comprising only resorcinol-formalin latices (RFL-2) were used. It is clearly seen that the adhesive composition of this invention is highly effective in bonding rubber to not only polyester fibers but also nylon fibers and rayon fibers.

Table 2

| Example | Adhesive composition Component [A] | [A]/[B$_2$]/[C$_2$] weight ratio | Kind of tire cord | Heat treatment °C × min. | Applied amount, % | Adhesion by H-test, kg/9 mm |
|---|---|---|---|---|---|---|
| Example a | [A$_{27}$] | 1.2/1/6 | Polyester cord | 240 × 1 | 6.3 | 12.8 |
| Comparative Example a | — | 0/1/6 | do. | do. | 6.5 | 4.5 |
| Example b | [A$_{27}$] | 1.2/1/6 | Nylon | 200 × 1 | 6.5 | 13.8 |
| Comparative Example b | — | 0/1/6 | do. | do. | 6.3 | 11.0 |
| Example c | [A$_{27}$] | 1.2/1/6 | Rayon cord | do. | 7.0 | 14.5 |
| Comparative Example c | — | 0/1/6 | do. | do. | 7.3 | 11.8 |

EXAMPLE 27

A liquid mixture, [B$_3$]+ [C$_3$] (hereinafter referred to as RFL-3), of a thermosetting resorcinol-formaldehyde resin and a rubber latex was obtained by ageing for 5 days at room temperature a composition comprising 37 parts of resorcinol, 20 parts of 37%-formalin, 63 parts of water, 200 parts of a vinylpyridine-stryrene-butadiene copolymer rubber latex, 40% in solid content (Hycar 2518 FS, a product of Nippon Geon), and 50 parts of a styrene-butadiene copolymer rubber latex, 40% in solid content (Nipol LX-110, a product of Nippon Geon) (360 parts in total).

The compound [A$_{27}$] obtained in Example 26 was made into an aqueous ammonia solution of 20% solid content. The solution was mixed with RFL-3 in varied ratios to obtain adhesive compositions, [A$_{27}$] + [B$_3$] + [C$_3$]. Variation in weight ratio of the resin to the latex was made by the addition of the vinylpyridine-styrene-butadiene copolymer rubber latex of 40% of solid content. Concentration of the adhesive composition was adjusted by dilution with water so that the amount of the adhesive adhered on polyester fiber may be adequate.

The same polyester cord as used in Example 1 was dipped into the above adhesive composition, dried at 130°C for 1 minute, and heat-treated at 240°C for 1 minute. The treated cord was embedded in an unvulcanized rubber compound of the cmposition mentioned below, and press-vulcanized at 150°C for 50 minutes. Adhesion of the laminate was evaluated by H-test to obtain the results as shown in Table 3. It is seen from the Table that a favorable adherence can be obtained under widely varied conditions when the novel compound [A] was incorporated in RFL and that particularly remarkable results are obtained when the ratio of the component [A] to the RF resin is within a range from 2/1 to 1/5.

Composition of the rubber compound:
50 Parts Natural rubber RSS No. 3
50 Parts SBR No. 1500
5 Parts Zinc oxide
1 Part Stearic acid
50 Parts Carbon black
3 Parts Process oil
1 Part Accelerator DM
0.3 Part Accelerator TT (tetrathiuram disulfide)
2.8 Parts Sulfur Table 3

| Example No. | Adhesive composition [A$_{27}$]/[B$_3$]/[C$_3$] weight ratio | Heat treatment °C × min. | Adhesion by H-test kg/9 mm Room temp. | 120°C |
|---|---|---|---|---|
| a | 10/1/8 | 240 × 1 | 9.5 | 8.0 |
| b | 5/1/4 | do. | 11.7 | 10.3 |
| c | 2/1/2.3 | 240 × 1 | 13.5 | 11.2 |
| d | 1/1/2.3 | do. | 13.4 | 11.1 |
| e | 1.5/1/2.3 | do. | 11.7 | 10.8 |
| f | 0.1/1/2.3 | do. | 9.1 | 7.8 |
| Comparative example | 0/1/2.3 (RFL-3) | do. | 5.5 | 3.9 |

EXAMPLE 28

Similarly to the preparation of the compound $[A_{27}]$ in Example 26, mixtures of polynucleus halophenol compounds were prepared from p-chlorophenol and formaldehyde in varied molar ratios. The compounds were further converted into methylol derivatives which were subjected to addition-condensation reaction with resorcinol to obtain p-chlorophenol-formaldehyde resin polynucleus product-resorcinol-based resins having different molecular weights (compounds $[A_{28}]$ to $[A_{33}]$). In a manner similar to that in Example 1, these compounds were made into aqueous ammoniacal solutions, each 20% in solid content, and mixed with RFL-1 to obtain adhesive compositions, $[A_{28}] - [A_{33}] + [B_1] + [C_1]$.

In the same manner as in Example 1, the same polyester cord as used in Example 1 was dipped into the above adhesive composition and then press-cured at 150°C for 50 minutes to obtain a laminate, except that the rubber compound mentioned in Example 27 was used. On evaluating the adhesion by the H-test, the results as shown in Table 4 were obtained. It is seen that a halophenol-formaldehyde resin, which is the main constituent of the compound [A], having a polymerization degree of 2 to 6 is excellent in bond stability especially at high temperatures.

ture, $[B_4] + [C_4]$, 20% in solid content (hereinafter referred to as RFL-4). 520 Parts of the RFL-4 was admixed with 150 parts of an aqueous ammoniacal solution of the compound $[A_{34}]$ to obtain an adhesive composition in which $[A_{34}]/[B_4]/[C_4]$ is 2/1/6 by weight.

The polyester cord mentioned in Example 1 was dipped into the above adhesive composition, dried at 110°C for 2 minutes, heat-treated at 230°C for 2 minutes, then embedded in the rubber compound mentioned in Example 27, and press-cured at 150°C for 50 minutes to obtain a laminate. On evaluating the adhesion by the H-test, the laminate showed a mean pull-out force of 12.8 kg/9 mm at room temperature and 10.9 kg/9 mm at 120°C.

EXAMPLE 30

0.5 Mole of p-chlorophenol, 0.5 mole of p-cresol and 48.6 g (0.6 mole) of 37%-formalin were dissolved in dioxane and further admixed with 1 g of concentrated hydrochloric acid and 1 g of oxalic acid. The mixture was heated with stirring under a nitrogen atmosphere at 100°C for about 4 hours to undergo cross-condensation, yielding a solution of halogenated phenol polynucleus product in which p-chlorophenol and p-cresol are joined through methylene linkage. The solution was admixed with an aqueous solution of sodium Table 4

| Example No. | Adhesive composition | | | | Heat treatment °C × min. | Adhesion by H-test, kg/9 mm | |
|---|---|---|---|---|---|---|---|
| | Component [A] | | | [A]/[B₁][C₁] weight ratio | | | |
| | p-Chlorophenol /formaldehyde molar ratio | Mean polymerization degree* | | | | Room temperature | 120°C |
| a | 1/0.3 | 2 | $[A_{28}]$ | 4/1/8 | 245 × 1 | 13.4 | 11.1 |
| b | 1/0.4 | 2.5 | $[A_{29}]$ | do. | do. | 13.5 | 11.3 |
| c | 1/0.6 | 3 | $[A_{30}]$ | do. | do. | 13.0 | 11.0 |
| d | 1/0.7 | 4 | $[A_{31}]$ | do. | do. | 12.1 | 10.8 |
| e | 1/0.8 | 6 | $[A_{32}]$ | do. | do. | 11.6 | 10.5 |
| Comparative example | 1/0.9 | 10 | $[A_{33}]$ | do. | do. | 9.0 | 7.8 |

* Mean polymerization degree of the polynucleus compound after removal of the monomer.

EXAMPLE 29

0.5 Mole of bis(5-chloro-2-hydroxyphenyl)-methane and 0.5 mole of bis(5-chloro-2-hydroxyphenyl) sulfide were reacted with 3 moles of formaldehyde under alkaline conditions. The reaction mixture was neutralized with hydrocholoric acid and then reacted with 4 moles of resorcinol to obtain a novel compound $[A_{34}]$ consisting mainly of a mixture of $[A_1]$ and $[A_2]$. Without being purified, the compound $[A_{34}]$ was freed from the solvent, dried, and made into an ammoniacal aqueous solution containing 20% of solids, in the same way as in Example 1.

On the other hand, 11.0 parts of resorcinol, 9.7 parts of 37%-formalin, 3.0 parts of a 10%-aqueous solution of sodium hydroxide, and 98.3 parts of water (122 parts in total) were reacted with stirring at 30°C for 2 hours. The resulting resin was mixed with 169 parts of a vinylpyridinestyrene-butadiene copolymer rubber latex (Hycar 2518 FS, a product of Nippon Geon, 40% in solid content), 45 parts of a chloroprene latex (Neoprene latex-400, a product of Showa Neoprene, 50% in solid content), and 164 parts of water and left standing at room temperature for 3 days to obtain a liquid mixhydroxide to bring pH to about 9 and then further admixed with 1.2 moles of formaldehyde to undergo methylolation reaction at 80°C. After having been cooled, pH of the reaction mixture was adjusted to 6 by addition of hydrochloric acid. 15 Moles of resorcinol was added to the mixture and allowed to react at 100°C to yield a polynucleus halophenol compound $[A_{35}]$ consisting mainly of a p-chlorophenol-p-cresol-formaldehyde resin which has terminal resorcinol groups. Without having been purified, the compound $[A_{35}]$ was freed from the solvent, dried, and brought into an aqueous ammoniacal solution, 20% in solid content. The solution was further mixed with RFL-1 to obtain an adhesive composition, $[A_{35}] + [B_1] + [C_1]$.

The same polyester cord as used in Example 1 was dipped into the above adhesive composition, dried at 130°C for 1 minute, heat-treated at 240°C for 1 minute, then embedded in the rubber compound mentioned in Example 27, and press-cured at 150°C for 50 minutes to obtain a laminate. On evaluating the adhesion by the H-test, the laminate showed a mean pull-out force of 13.1 kg/9 mm at room temperature and 11.0 kg/9 mm at 120°C.

EXAMPLE 31

One mole of resorcinol and 24 g (0.3 mole) of 37%-formalin were charged in a reactor and gradually heated while being stirred. When the temperature reached about 70°C reaction began to proceed with evolution of heat which was removed by cooling. The reaction was allowed to continue at 100°C for 30 minutes, after which time further 24 g (0.3 mole) of 37%-formalin was added dropwise thereto while maintaining the same conditions. After addition of 0.5 part of oxalic acid, the mixture was heated at 100°C for about 1 hour, and then freed from the water by distillation to leave a fusible resorcinol-formaldehyde resin[$D_1$]. 30 Parts of the polynucleus halophenol compound [$A_1$] obtained in Example 1, 30 parts of the resin [$D_1$], 30 parts of 28%-aqueous ammonia, and 210 parts of water were mixed with stirring to yield a solution containing [$A_1$] and [$D_1$]. The solution was mixed with 420 parts of RFL-1 and diluted with 200 parts of water to obtain an adhesive composition, [$A_1$] + [$B_1$] + [$C_1$] + [$D_1$], 20% in solid content.

The same polyester cord as used in Example 1 was dipped into the above adhesive composition, dried at 130°C for 1 minute, heat-treated at 240°C for 1 minute, then embedded in the rubber compound mentioned in Example 27, and press-cured at 150°C for 50 minutes to obtain a laminate. Upon evaluation of the adhesion by the H-test, the laminate showed a mean pull-out force of 13.2 kg/9 mm at room temperature and 10.7 kg/9 mm at 120°C.

What is claimed is:

1. In an adhesive composition for bonding polyester fiber to rubber, which composition comprises:
   i. a polynucleus halophenol compound,
   ii. a thermosetting resin which is obtained by the reaction of resorcinol with formaldehyde in a molar ratio of resorcinol to formaldehyde within the range 1/0.7 to 1/3.0 in the presence of an alkali catalyst, and
   iii. a rubber latex;

and wherein the solids weight ratio of (i)/(ii) is 10/1 to 1/10 and the solids weight ratio of ((i)+(ii))/(iii) is 2/1 to 1/10; the improvement which comprises employing as the polynucleus halophenol compound (i), a compound of the formula:

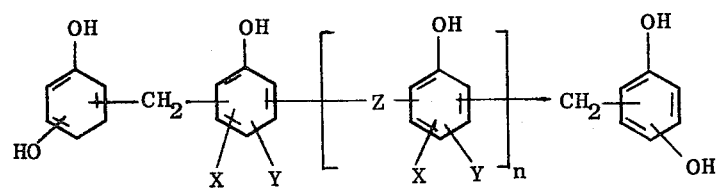

where X is chlorine or bromine, Y is chlorine, bromine, hydrogen, hydroxyl, or alkyl of 1 to 4 carbon atoms, Z is —$S_x$— in which $x$ is an integer of 1 to 4, —$S(O)_y$— in which $y$ is 1 or 2, or

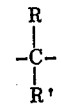

in which R and R' may be the same or different and are hydrogen, $C_{1-8}$ alkyl, $C_{6-18}$ aryl, $C_{7-18}$ aralkyl, $C_{1-8}$ haloalkyl or furyl, and $n$ is an integer of 1 to 6.

2. In the adhesive composition according to claim 1, the improvement which comprises employing as the polynucleus halophenol compound a compound of the general formula,

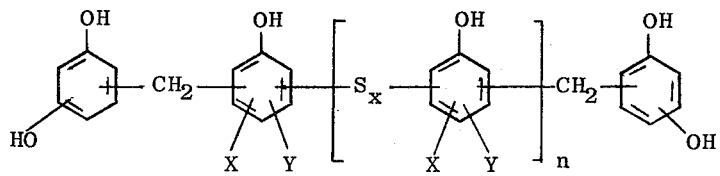

wherein X is chlorine or bromine, Y is chlorine, bromine, hydrogen, hydroxyl or alkyl of 1 to 4 carbon atoms, $x$ is an integer of 1 to 4, and $n$ is an integer of 1 to 6.

3. An adhesive composition according to claim 2, wherein the polynucleus halophenol compound is

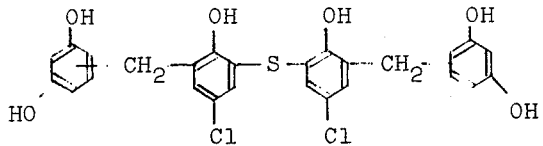

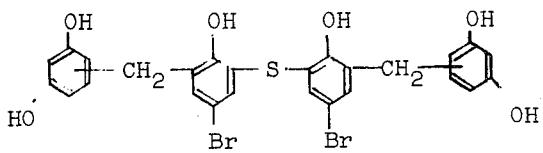

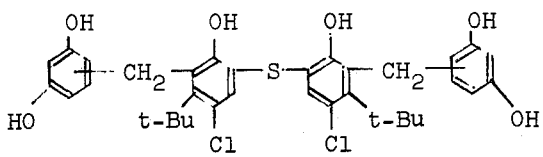

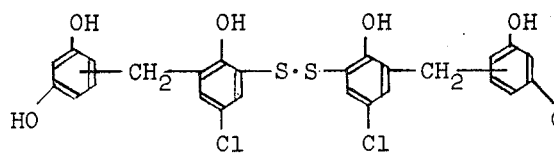 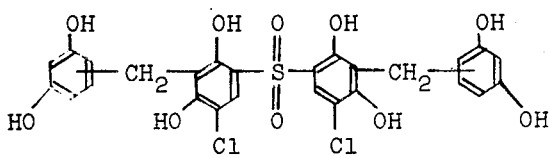

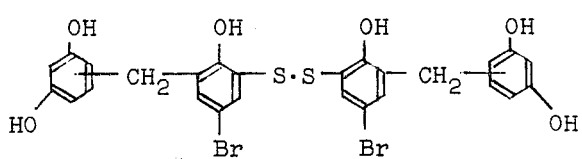 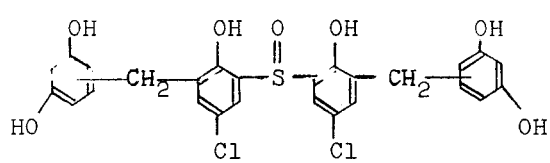

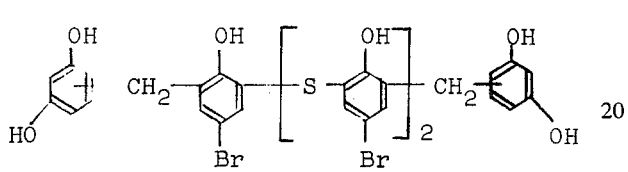 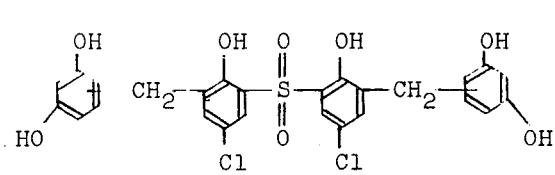

or

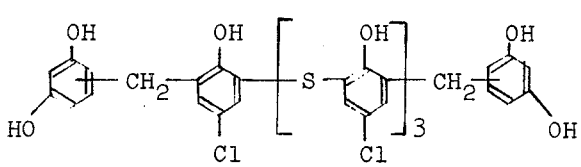 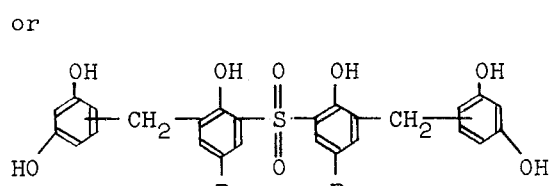

or

4. In the adhesive composition according to claim 1, the improvement which comprises employing as the polynucleus halophenol compound a compound of the general formula, 6. In the adhesive composition according to claim 1, the improvement which comprises employing as the polynucleus halogenophenol compound a cmpound of the general formula,

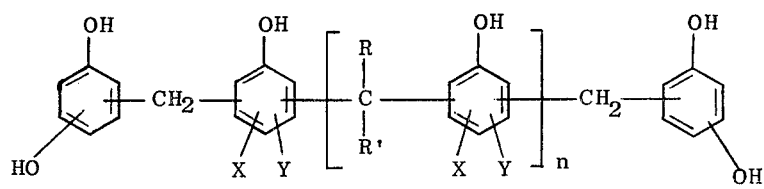

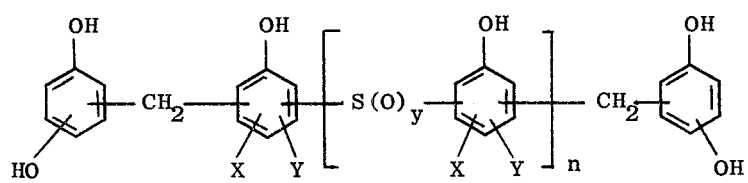

wherein X is chlorine or bromine, Y is chlorine, bromine, hydrogen, hydroxyl, or alkyl of 1 to 4 carbon atoms, $y$ is 1 or 2, and $n$ is an integer of 1 to 6.

5. An adhesive composition according to claim 4, wherein the polynucleus halophenol compound is wherein X is chlorine or bromine, Y is chlorine, bromine, hydrogen, hydroxyl, or alkyl of 1 to 4 carbon atoms, R and R' and are hydrogen, $C_{1-8}$ alkyl, $C_{6-18}$ aryl, $C_{7-18}$ aralkyl, $C_{1-8}$ haloalkyl or furyl, and $n$ is an integer of 1 to 6.

7. An adhesive composition according to claim 6, wherein the polynucleus halophenol compound is

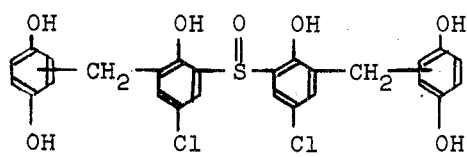 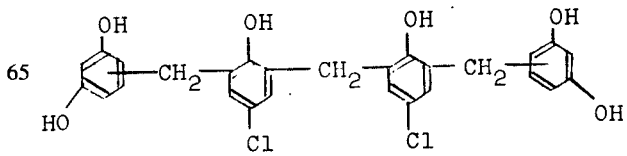

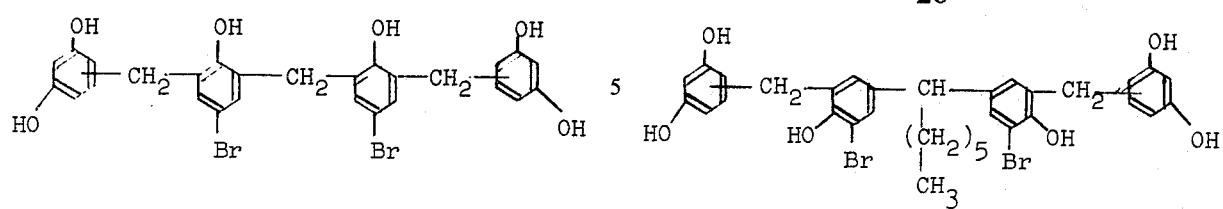
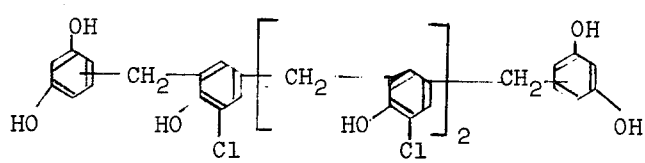
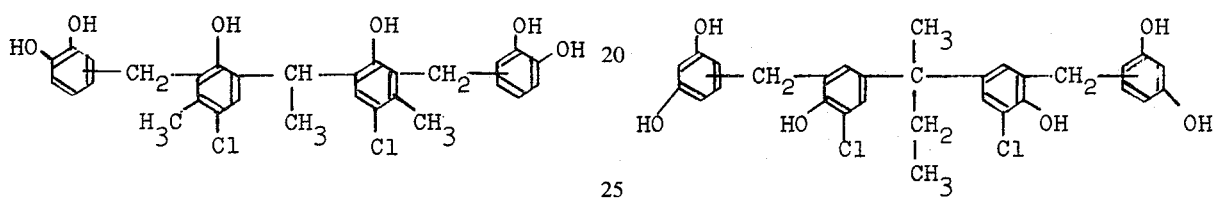
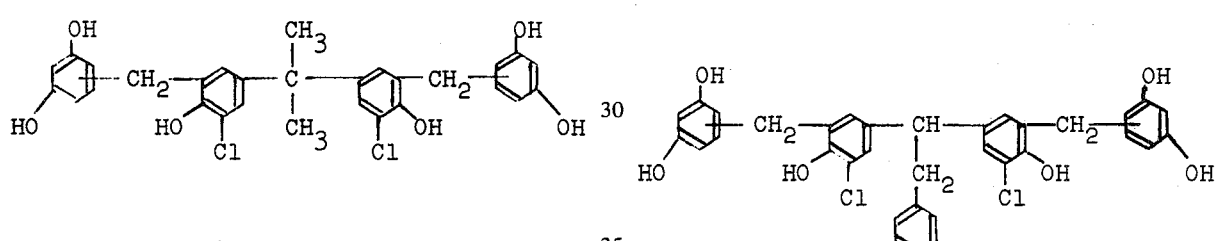
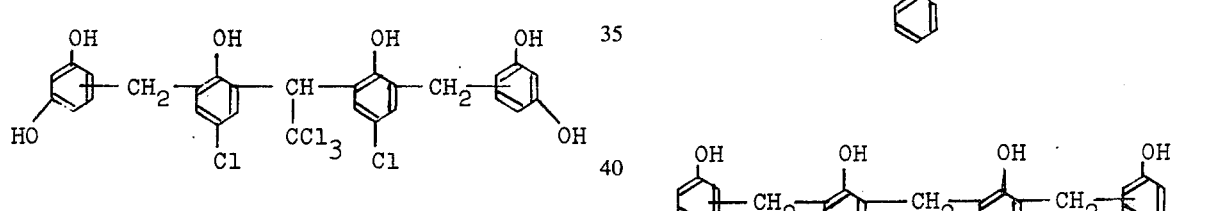
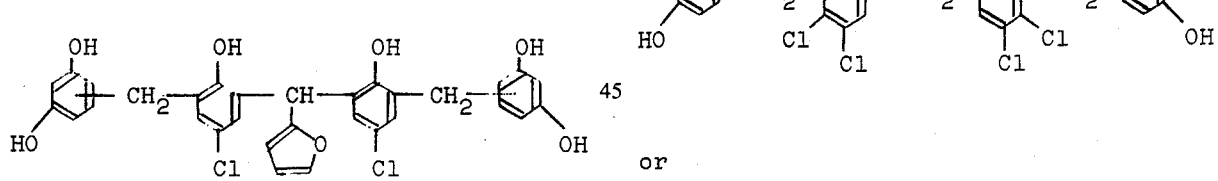
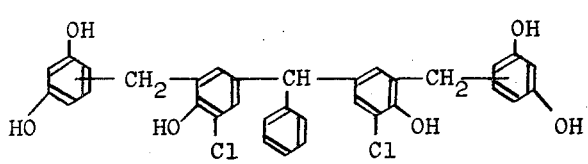
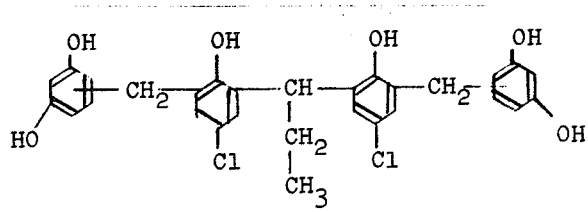

(n = 2-6)

8. An adhesive composition according to claim 1, wherein said adhesive composition comprises the aqueous dispersion containing (i), (ii) and (iii) in such proportions by weight on solid basis that [A]/[B] is in the range of 7/1 to 1/2 and [A] + [B]/[C] is in the range of 1/1 to 1/5.

9. An adhesive composition according to claim 1, wherein the aqueous dispersion has a pH of 8 to 10.

10. An adhesive composition according to claim 1, wherein the polynucleus halophenol compound is a compound represented by the general formula,

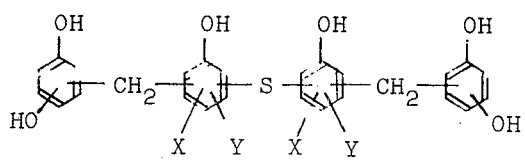

wherein X and Y are the same as defined in claim 1.

11. An adhesive composition according to claim 1, wherein the polynucleus halophenol compound is of the general formula,

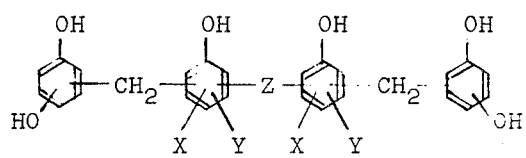

wherein X and Y are the same as defined in claim 1 and Z is $-S_{x'}-$ in which $x'$ is an integer of 2 to 4, $-S(O)_y-$ in which $y$ is 1 or 2, or

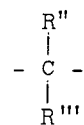

in which R'' and R''' are hydrogen or $C_{1-8}$ alkyl, $C_{6-18}$ aryl, $C_{1-8}$ haloalkyl or furyl groups.

* * * * *